United States Patent

Podszun et al.

[11] Patent Number: 6,035,720
[45] Date of Patent: Mar. 14, 2000

[54] METHOD AND DEVICE FOR SIMULATING AN IMPRESSION WHICH IS SUBJECTIVELY PERCEIVED BY AN OCCUPANT OF A VEHICLE IN PARTICULAR OF PASSENGER CAR WHEN THE VEHICLE IS BEING OPERATED

[75] Inventors: Werner Podszun, Nuertingen; Klaus Genuit, Aachen, both of Germany

[73] Assignee: DaimlerChrysler AG, Stuttgart, Germany

[21] Appl. No.: 09/188,298

[22] Filed: Nov. 10, 1998

[30] Foreign Application Priority Data

Nov. 10, 1997 [DE] Germany ............................ 197 49 588

[51] Int. Cl.$^7$ ........................... G01M 17/00; A61F 11/06
[52] U.S. Cl. .......................... 73/669; 73/11.08; 381/71.4; 307/10.1
[58] Field of Search ......................... 73/669, 662, 11.08, 73/11.09, 667, 668, 579, 687, 671; 381/71.4, 86, 71.1, 89, 71.8; 307/10.1

[56] References Cited

U.S. PATENT DOCUMENTS

| | | | |
|---|---|---|---|
| 5,063,598 | 11/1991 | Geddes | 381/71 |
| 5,434,783 | 7/1995 | Pal et al. | 364/508 |
| 5,479,823 | 1/1996 | Van Hout et al. | 73/579 |
| 5,551,298 | 9/1996 | Rayment | 73/669 |
| 5,618,995 | 4/1997 | Otto et al. | 73/669 |
| 5,665,901 | 9/1997 | Ilzig et al. | 73/669 |
| 5,748,748 | 5/1998 | Fischer et al. | 381/71.4 |

FOREIGN PATENT DOCUMENTS

| | | |
|---|---|---|
| 42 28 695 A1 | 3/1993 | Germany . |
| 43 08 398 C2 | 9/1993 | Germany . |
| 44 10 723 A1 | 10/1994 | Germany . |
| 44 42 233 A1 | 6/1995 | Germany . |
| 44 41 726 A1 | 7/1995 | Germany . |
| 195 31 402 A1 | 2/1997 | Germany . |
| 197 42 627 A1 | 4/1998 | Germany . |

*Primary Examiner*—Hezron Williams
*Assistant Examiner*—Helen C. Kwok
*Attorney, Agent, or Firm*—Evenson, McKeown, Edwards & Lenahan, PLLC

[57] ABSTRACT

A method for simulating an impression which is perceived subjectively by an occupant of a vehicle, in particular of a passenger car, when the vehicle is being operated, as well as a device, for example, for carrying out such a method are provided. In the method, the primary oscillations which are produced when a vehicle to be investigated is being operated and which are perceived subjectively are registered. Data for generating secondary oscillations are acquired from the primary oscillations and are converted into the secondary oscillations, and a simulation unit, which simulates, among other things, in particular a passenger car representationally at least in certain areas, is operated. In the simulation unit which is elastically mounted or secured with respect to the floor, vibration oscillations, which are acquired from the primary oscillations, are induced at a location from which they are transmitted into a seat and/or into the steering wheel. In order to determine the source of the complaints, specific frequencies of the vibration oscillations are then changed selectively.

28 Claims, 1 Drawing Sheet

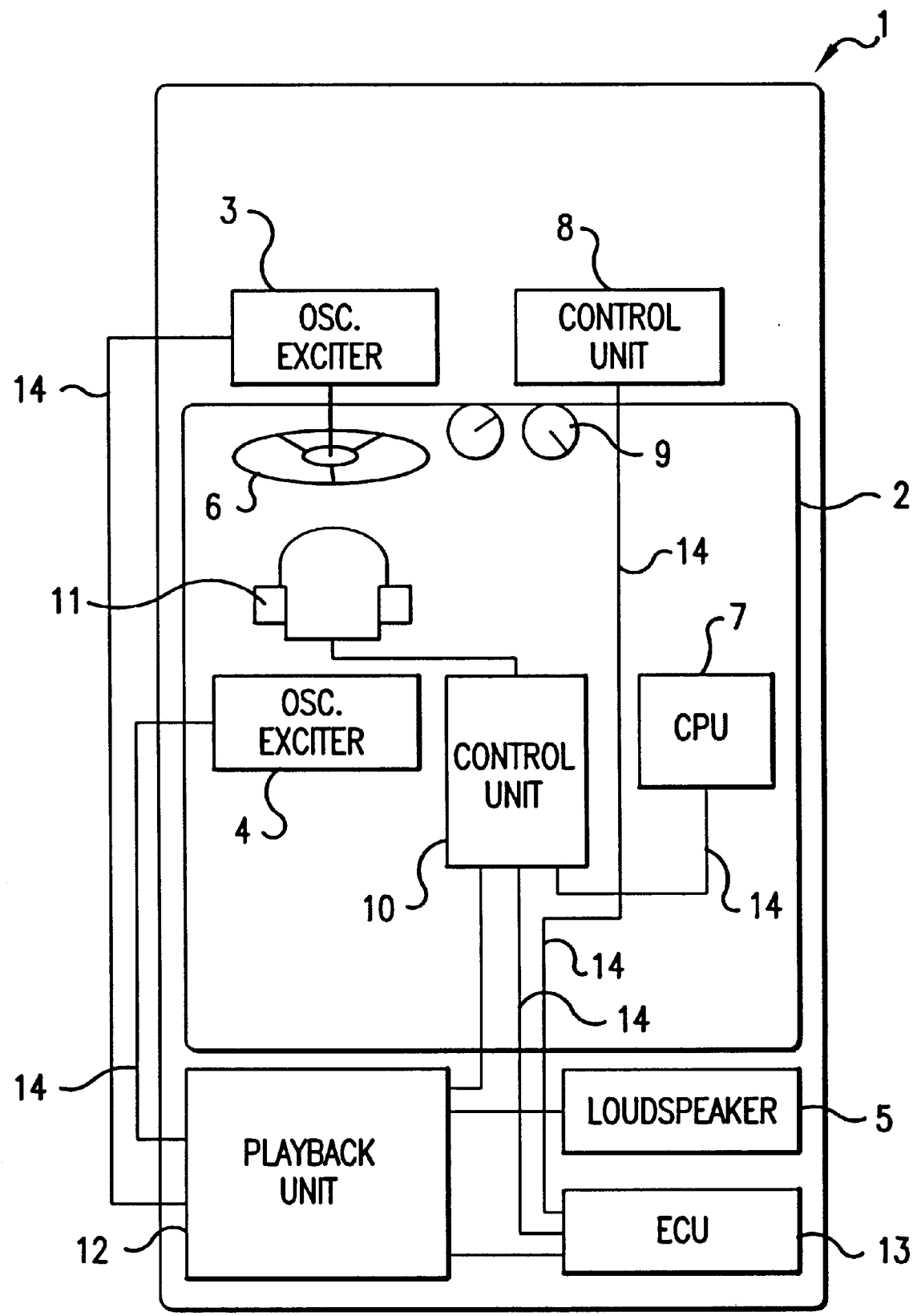

METHOD AND DEVICE FOR SIMULATING AN IMPRESSION WHICH IS SUBJECTIVELY PERCEIVED BY AN OCCUPANT OF A VEHICLE IN PARTICULAR OF PASSENGER CAR WHEN THE VEHICLE IS BEING OPERATED

CROSS-REFERENCE TO RELATED APPLICATIONS

This application is related to co-pending application Ser. No. 09/188,676, filed Nov. 10, 1998 and entitled "Method And Device For Influencing An Impression Which Is Subjectively Perceived by an Occupant of a Vehicle, in Particular of a Passenger Car, When the Vehicle Is Being Operated".

BACKGROUND AND SUMMARY OF THE INVENTION

This application claims the priority of German Application No. 197 49 588.5, filed Nov. 10, 1997, the disclosure of which is expressly incorporated by reference herein.

The invention relates to a method and a device for simulating an impression which is subjectively perceived by an occupant of a vehicle, in particular of a passenger car, when the vehicle is being operated.

U.S. Pat. No. 5,618,995 discloses a simulation unit which is provided for determining the stresses on a passenger in a vehicle, in particular an off-road motor vehicle. The simulation unit has a base plate which is fixedly attached to the ground or floor and on which, inter alia, a seat, a small foot plate and a steering wheel are mounted. The aforesaid components are mounted spatially and functionally separated from one another on the base plate. An oscillation exciter is arranged between each individual component and the base plate. The individual oscillation exciters which are assigned to the components can be actuated separately from one another and induce in the component corresponding, low-frequency oscillations, so-called "vibrations", which can be perceived through the human body. The values for oscillation excitation are extracted for this purpose from a data record which has been previously defined.

U.S. Pat. No. 5,434,783 A1 discloses a vehicle in which the background noise which can be heard within a passenger cell is influenced by sound waves. In addition to normal loudspeakers, use is also made here of a piezoelement which excites at least parts of the vehicle body to oscillate and thus influences it so as to emit soundwaves; i.e. the piezoelement acts like a coil of a loudspeaker, while the vehicle body represents the oscillating diaphragm. The previously known method and device make it possible to improve the subjective sensation within the passenger cell.

A more extensive design of the above development for influencing the subjectively perceived driving impression is known from German Patent document DE 195 31 402 A1. According to this publication, not only the air-borne sound but also the structure-borne sound or vibrations perceived through the human body are influenced as a function of a parameter and, in this context, in particular the engine speed and/or the vehicle travel speed. For this purpose, depending on the magnitude of the parameter, certain data are read out of a data field and, with the aid of oscillation exciters, converted into, inter alia, secondary oscillations which can be perceived through the human body as well. By means of these measures it is possible, in conjunction with the influencing of the acoustically perceived air-borne sound, to generate both positive and negative interference of the artificial secondary oscillations with the primary oscillations which are formed in the vehicle when the vehicle is being operated. The interference may, depending on what is desired, reduce the perceived impression or else simulate a specific impression, for example a gear-changing operation in a vehicle which is provided with an infinitely variable speed gearbox.

If a certain level of background noise gives rise to complaints with regard to a vehicle, it is difficult in some cases to find the corresponding fault. In particular, these difficulties are due to the fact that human language does not have unambiguous terms for specific noises. Furthermore, the absolute acoustic memory itself is limited, even in trained people, to a few minutes at most.

The object of the invention is to develop the basic method and device such the sources of complaints based on subjective sensations in a vehicle can be found.

This and other objects are achieved with a method for simulating a subjectively perceived impression by an occupant of a vehicle, in particular of a passenger car, when the vehicle is being operated. Primary oscillations which are produced when a vehicle which is to be investigated is being operated and which are perceived subjectively are registered. Data for generating secondary oscillations are acquired from the primary oscillations and converted into the secondary oscillations. The secondary oscillations are used to operate a simulation unit which simulates, inter alia, in particular a passenger car, at least representationally in certain areas. The simulation unit is elastically mounted or secured with respect to the floor on which it is positioned. The vibrations which can be perceived through the human body, called vibration oscillations, are extracted from the primary oscillations and converted into the vibration oscillations. The vibration oscillations are induced at at least one location of the simulation unit from which they are transmitted into a seat and/or into the steering wheel. An oscillation exciter which induces the vibration oscillations in the seat oscillates freely with respect to the simulation unit, i.e. the oscillation exciter is at most elastically positioned on the floor, preferably not at all, and specific frequencies of the vibration oscillations are changed selectively.

Also provided by the invention is a device for simulating an impression which is subjectively perceived by an occupant of a vehicle, in particular of a passenger car, when the vehicle is being operated. Oscillation exciters output secondary oscillations in a simulation unit, the secondary oscillations simulating operation of the vehicle and being acquired from primary oscillations which are produced when the vehicle is actually being operated. The body of the vehicle is elastically secured with respect to the ground on which it is positioned. One oscillation exciter which induces mechanical vibration oscillations which can be perceived through the human body in the seat is arranged in a freely oscillating fashion with respect to the seat and fixedly with respect to the vehicle body. The one oscillation exciter which induces the vibration oscillations in the seat is secured at most elastically, preferably not at all, with respect to the ground on which the vehicle body is positioned. Another oscillation exciter which induces mechanical vibration oscillations which can be perceived through the human body in the steering wheel is arranged in the region of the steering system. The seat and/or the steering wheel are able to be excited so as to undergo vibration oscillations which can be sensed through the human body.

By means of the method and device according to the invention it is possible to store, in particular in an electronic data carrier, the overall impression which is based on perceptions of an acoustic nature and also on the part of the human body while the motor vehicle is being operated. This impression can then be experienced again at any time in a reproducible fashion using appropriate equipment. An oscillation exciter which excites vibration oscillations is also advantageously assigned to the steering wheel. Here, it is, in particular, surprising that specific impressions cannot be re-experienced again at all unless corresponding vibration oscillations are also excited in the steering wheel. If, on the other hand, the steering wheel is not excited, a completely different impression is produced. By means of the selective influencing of specific frequencies, different influences can then be checked and, if appropriate, eliminated.

Advantageously, it is sufficient to use only the vehicle body with a completed or correspondingly simulated passenger compartment, instead of a completely mounted vehicle, for example. In order to localize a troublesome sound it is possible to manipulate individual frequencies, enabling the cause of the troublesome sound to be easily determined with the device. In particular, the so-called acoustic memory, i.e. the precise recollection of the impression acquired when the vehicle was actually being operated is prolonged by any desired degree. In addition, it is possible with this simulation unit to sense the influence of further developments subjectively and compare the further development with the previous art. Furthermore, new developments can also be appropriately investigated and compared.

The introduction of the vibration oscillations is carried out by means of freely oscillating, in particular electrodynamic, oscillation exciters and takes place on a vehicle body which is elastically mounted with respect to the ground—that is the floor on which the simulation unit is positioned. Because of the freely oscillating arrangement of the oscillation exciter, the latter is assigned to the vehicle body in a fixed manner and has at most an elastic support with respect to the ground, that is to say the floor, and preferably no support at all.

The generation of the vibration oscillations can be carried out in a manner analogous to the method known from the field of active noise reduction so that more details are not necessary here.

The amplification of specific frequencies or frequency patterns and/or in particular their suppression includes and relates to the vibrations which can be perceived by the human body and are noticed by the driver and/or the vehicle occupants. In this context, frequency pattern is understood to be a plurality of frequencies which have, for example, a specific envelope curve or, for example, even a specific fourier spectrum. The respective frequencies when the vehicle is being operated may originate, for example, from the engine, the chassis, the tires, the condition of the road or else from the activated windscreen wiper or fan.

For a simple embodiment of the invention, it may be sufficient for the subjectively perceived vibrations to have frequencies up to 150 Hz gated out of the air-borne sound signal, which can be registered by means of one or more microphones, for example, of the operated vehicle through the use of a low-pass filter. The vibration oscillations are generated with the gated-out low-frequency component. Using the signals which give rise to the vibration oscillations, oscillation exciters in particular are actuated. These exciters are arranged in the steering gear and/or on the seat rail. In particular, it is advantageous to use a modified signal additionally to drive a low-frequency loudspeaker which then covers the low-frequency component of the acoustic air-borne sound.

The method or the device according to the invention can also advantageously be used for sound design. This can be used, inter alia, for finding or designing a suitable location for a loudspeaker and also other components, for example.

In particular, in this way devices can be manufactured with which, for example, test runs with various vehicles can be simulated so that the customer can be provided with a comfortable system for helping him to make a decision. This is easily possible since during the simulated test runs it is necessary to use only specific data records which reproduce the impression which a vehicle occupant would perceive in a vehicle type which is used for the simulated test run. Here, the visually perceived impression can also additionally be simulated by video or other optical methods.

Other objects, advantages and novel features of the present invention will become apparent from the following detailed description of the invention when considered in conjunction with the accompanying drawings.

BRIEF DESCRIPTION OF THE DRAWING

The single FIGURE is a schematic representation of a simulation unit which has, inter alia, a vehicle body of a passenger car, a control unit and various measures for influencing subjective impressions which a vehicle occupant perceives when the vehicle is actually being operated.

DETAILED DESCRIPTION OF THE DRAWING

In order to ensure that the desired simulation occurs, the following components are arranged in and/or on the vehicle body: an electrodynamic oscillation exciter 3 which is arranged in the region of the engine compartment and on the steering gear, a control unit 8 for the visual display instruments 9 such as tachometer or rev counter, etc., a computer unit 7 for storing and manipulating the secondary oscillations, a control unit 10 for setting the desired variables, etc., a head set 11 for acoustic simulation, an electrodynamic oscillation exciter 4 for inducing vibration oscillations in the seat, a playback unit 12 with amplifier and equalizer for the secondary oscillations and the vibration oscillations which are correlated in particular therewith, and an electronic control device 13 for actuating the aforesaid components which are connected to it via the leads 14. Apart from the components, the simulation unit also has loudspeakers (not shown) which are associated with an acoustic influencing system known in the art as "active noise control" or ANC (see U.S. Pat. No. 5,063,598 A1, for example).

The oscillation exciters 3, 4 which are arranged on the vehicle body 1 and/or in the passenger compartment 2 are at least primarily configured for frequencies which are perceived by the body of a vehicle occupant and are referred to here as vibrations. These are in particular oscillations with frequencies below 150 Hz.

In order to cover the frequency range below 150 Hz in terms of air-borne sound, a low-frequency loudspeaker 5 ("subwoofer") is arranged in the rear area of the vehicle body 1. In the region of the steering wheel 6, the vehicle body 1 (which is preferably only simulated with respect to the passenger compartment 2, i.e. in particular not fitted out with an engine and/or other assemblies), has the electrodynamic oscillation exciter 3.

Using the oscillation exciters 4, 3 which, during operation, are preferably indirectly assigned to the seat, and are preferably directly assigned to the steering wheel 6, it is possible to generate vibration oscillations and induce them in the seat and/or in the steering wheel 6.

In order to excite the seat with the vibration oscillations, the assigned oscillation exciter 4, which is freely oscillating with respect to the seat and arranged without support with respect to the ground, is usefully arranged in the region of the floor panel of the vehicle body 1. The corresponding oscillation exciter 3 which is related to the steering wheel 6 is conveniently arranged on the steering gear in a preferably rigid fashion.

The method according to the invention for simulating the subjective impression is described below.

When a passenger car is actually being operated, the passenger car is excited in different ways so as to undergo primary oscillations which are subjectively perceived by the driver. The primary oscillations have, inter alia, an acoustic component which relates to the air-borne sound (approximately 16 Hz–16 kHz) and a low-frequency component, which is the vibrations. In particular, these include vibrations with frequencies between 0.5 and 150 Hz. The audible sound and the sound which can be perceived through the human body may, in particular if the sound pressure of the air-borne sound component is large enough, overlap in the low-frequency range.

The primary oscillations are determined and registered in particular between 0.1 Hz and 20 kHz, preferably between 0.5 Hz and 16 kHz, and most preferably between 1 Hz and 16 kHz, by various types of detectors. The data which are determined are evaluated in a known fashion with an electronic computer unit 7, for example, and converted into a storable primary data record. Those data which are assigned to the vibration oscillations which can be perceived through the human body are extracted, as a vibration data record, from the particularly electronically buffered primary data record, and can thus be converted at any time into a corresponding response signal for the vibration oscillations. With the computer unit 7, they can then be correspondingly manipulated, it being possible to set the desired manipulation in particular at the control unit 10. The remaining data can be used in particular in a known fashion for acoustic simulation.

Instead of electronic storage, the storage of the primary oscillations (or else of the data records) can, if appropriate, be carried out magnetically (for example on magnetic tapes) or mechanically (for example on a phonographic record).

During the simulation, the vibration oscillations are generated from the vibration data record, in which case however only frequencies up to 150 Hz are considered for this. For the vibration oscillations—specifically both for the oscillations which are transmitted through the air and the oscillations which are transmitted directly via mechanical elements—the oscillation exciters 3, 4 are actuated. They then cause the seat and the steering wheel 6 to undergo the vibration oscillations, as well as via the steering column in the vehicle by means of the low-frequency loudspeaker 5.

Here, it is, among other things, advantageous that the primary data record (or else even a conditioned vibration data record) is transferred via cable or via a radio link from a measurement place at which the subjective impression of the vehicle about which there was a complaint has been registered, to a specific location at which the simulation unit is located. The primary data record is preferably permanently stored and can thus also be continuously retrieved. The retrievable data records can be manipulated in the simulation unit and evaluated in a cost-saving fashion by appropriately trained specialist personnel.

The manipulation is usefully carried out by virtue of the fact that specific individual data items of the vibration data record which are assigned to specific frequencies are changed in a selective fashion. This procedure makes it possible to make an assessment without the specialist personnel having to travel, or the vehicle about which there is a complaint having to be transported to them. If appropriate, recommendations on how to eliminate the reasons for the complaints can then also be issued from the location of the simulation unit.

For the component of the primary oscillations which can be perceived through the human body, the vibrations of the vehicle body, the floor panel, a seat and/or of the steering wheel are advantageously measured. The measurement of the vibrations is expediently carried out with acceleration, speed and/or displacement sensors.

A more costly but also more precise way of determining the primary oscillations can then be carried out in particular using multi-channel technology and at least in part through the use of artificial head technology in which both the acoustically perceivable oscillations and the vibrations of the vehicle body 1, of the floor panel, in the seat and/or at the steering wheel 6 are registered.

In order to simulate, for example, two mechanical components, in particular the seat and the steering wheel 6, and the acoustic impression by way of the headset 11, it is favorable to use multi-channel technology with at least four channels. Here, preferably two broadband channels are provided for the headset 11 and two narrowband channels for the movement of the seat, in particular in the z-direction and for the movement of the steering wheel 6.

In order to allow for rotary movements of the head, it is possible to integrate a head tracker. A head tracker is to be understood as a system which, in the case of a simulation with a headset 11, measures movements of the head and calculates and changes the oscillations in such a way that, as before, the impression is given that the impression remains stable with respect to a location. This means that a noise which is locally perceived in the headset 11, for example in the region of the B pillar of the vehicle body 1, can, as before, be localized in this region, that is to say the B pillar, even when the head, and thus the headset 11, is rotated. The acoustic impression is therefore spatially fixed, for which reason the acoustic environment remains stationary when the head is moved, and a particularly good spatial location of the possibly disruptive noise source is made possible.

The simulated oscillations are then favorably induced at least in part at the locations at which the primary oscillations have been determined on the vehicle which is actually being operated.

For a qualitative simulation of the low-frequency oscillations it is, as a rule, necessary only to derive from the air-borne sound the structure-borne sound excitations by means of low-pass filters with a cut-off frequency of 150 Hz. During the simulation, the headsets 11 themselves are then actuated by means of a high-pass filter with a cut-off frequency of 150 Hz, in order to avoid double acoustic irradiation in the lower cut-off range.

If a simulation is desired with quantitatively reproducible data records, it is expedient to perform multi-channel measurements with separate recording of air-borne sound and vibrations.

As already mentioned, the simulation is usefully carried out in a space which simulates the passenger compartment 2 of the vehicle 1, as a result of which the same or at least comparable spatially acoustic conditions as during the acquisition of the primary data record apply. In addition, in this way, it is possible to adapt satisfactorily the acoustic and optical perception. Furthermore, in this context, the system components such as a controller, power supply, etc. can be accommodated inthe boot of the vehicle and/or in the free engine space.

Standardized headsets 11 with high-pass-adapted cut-off frequency of 150 Hz are used to play back the air-borne sound signals. The low-frequency air-borne sound excitation which can be perceived through the human body are fed in with a low-frequency loudspeaker 5 (subwoofer), which is actuated, for example, with low-pass-filtered data of the primary data field.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

What is claimed is:

1. A method for simulating an impression subjectively perceived by an occupant of a vehicle when the vehicle is being operated, the method comprising the acts of:

registering primary oscillations which are perceived subjectively and are produced when the vehicle which is being investigated is operated;

acquiring data for generating secondary oscillations from the primary oscillations, and converting said data into the secondary oscillations;

using the secondary oscillations to operate a simulation unit which simulates at least representationally in certain areas the vehicle being investigated, wherein the simulation unit is elastically mounted with respect to a floor on which the simulation unit is positioned;

wherein the act of using the secondary oscillations to operate the simulation unit comprises the acts of:

extracting from the primary oscillations vibrations which are perceivable through the human body and converting said vibrations into vibration oscillations;

inducing the vibration oscillations at at least one location of the simulation unit, from which said induced vibration oscillations are transmitted into at least one of a seat and steering wheel, wherein an oscillation exciter used to the vibration oscillations in the seat oscillates freely with respect to the simulation unit; and selectively changing specific frequencies of the vibration oscillations.

2. The method according to claim 1, wherein the act of freely oscillating the oscillation exciter with respect to the simulation unit is carried out by at most, elastically positioning the oscillation exciter on the floor.

3. The method according to claim 1, wherein the primary oscillations are converted into an electronically storable primary data record, and the primary data record is transferred to the simulation unit.

4. The method according to claim 3, wherein the primary data record is stored on a data carrier in at least one of a mechanical, magnetic and electronic manner.

5. The method according to claim 3, wherein data which are assigned to the vibrations perceivable through the human body are extracted, as a vibration data record, from the primary data record, and further wherein the vibration data record is converted into vibration oscillations, and still further wherein specific data of the vibration data record which are assigned to specific frequencies are changed selectively.

6. The method according to claim 1, wherein in the simulation unit, the data from a primary data record are output and converted into the secondary oscillations.

7. The method according to claim 1, wherein the vibration oscillations are copied from the primary oscillations, and wherein, in order to generate acoustic secondary oscillations, the vibration oscillations remain in the primary oscillations.

8. The method according to claim 3, wherein the vibration data record is copied from the primary data record, and wherein, in order to generate acoustic secondary oscillations, the data of the vibration data record also remain in the primary data record.

9. The method according to claim 1, wherein only oscillations with a maximum frequency of 300 Hz are induced as vibration oscillations.

10. The method according to claim 1, wherein only oscillations with a maximum frequency of 200 Hz are induced as vibration oscillations.

11. The method according to claim 1, wherein only oscillations with a maximum frequency of 150 Hz are induced as vibration oscillations.

12. The method according to claim 1, wherein the primary oscillations are determined only with acoustic methods.

13. The method according to claim 1, wherein acoustically perceivable primary oscillations are recorded in artificial head technology.

14. The method according to claim 1, wherein in order to determine the primary oscillations, the vibrations of at least one of a vehicle body, a floor panel of the vehicle, in a seat of the vehicle and at a steering wheel of the vehicle are registered.

15. The method according to claim 1, wherein in order to determine the primary oscillations using multi-channel technology, both acoustically perceptible oscillations and the vibrations of at least one of a vehicle body, a floor panel of the vehicle, in a seat of the vehicle and at a steering wheel of the vehicle are registered.

16. The method according to claim 14, wherein the vibrations are recorded with at least one of acceleration, speed and displacement sensors in the vehicle.

17. The method according to claim 15, wherein the vibrations are recorded with at least one of acceleration, speed and displacement sensors in the vehicle.

18. The method according to claim 1, wherein the secondary oscillations and vibration oscillations are played back in a passenger compartment of a passenger cell.

19. The method according to claim 11 wherein a low-frequency loudspeaker is operated with acoustic secondary oscillations which are smaller than 300 Hz.

20. The method according to claim 1, wherein a low-frequency loudspeaker is operated with acoustic secondary oscillations which are smaller than 200 Hz.

21. The method according to claim 1, wherein a low-frequency loudspeaker is operated with acoustic secondary oscillations which are smaller than 150 Hz.

22. The method according to claim 1, wherein the vibration oscillations are induced by electrodynamic oscillation exciters.

23. A device for simulating an impression subjectively perceived by an occupant of a vehicle when the vehicle is being operated, the device comprising:

oscillation exciters which output secondary oscillations in a simulating manner, the secondary oscillations simulating operation of the vehicle and being acquired from primary oscillations produced when the vehicle is actually being operated;

a body of the vehicle elastically secured with respect to a base on which the body is positioned;

wherein the oscillation exciters comprise:

a first oscillation exciter which induces mechanical vibration oscillations perceivable through the human body in a seat, said first oscillation exciter being arranged in a freely oscillating fashion with respect to the seat and fixedly with respect to the vehicle body, wherein the first oscillation exciter is secured at most elastically with respect to a base on which the vehicle body is positioned;

a second oscillation exciter which induces mechanical vibration oscillations perceivable through the human body in a steering wheel, the second oscillation exciter being arranged in a region of a steering system; and wherein at least one of the seat and the steering wheel are able to be excited with the oscillation exciters so as to undergo vibration oscillations which are perceivable through the human body.

24. The device according to claim 23, further comprising a plastic headset for outputting acoustic secondary oscillations.

25. The device according to claim 23, further comprising a low-frequency loudspeaker producing airborne sound.

26. The device according to claim 23, wherein the first and second oscillation exciters are electrodynamic oscillation exciters.

27. A method for simulating impressions subjectively perceived by an occupant from different vehicles, the method comprising the acts of:

(a) registering primary oscillations which are perceived subjectively and are produced when the different vehicles which are being investigated are operated;

(b) acquiring data for generating secondary oscillations from the primary oscillations, and converting said data into the secondary oscillations;

(c) using the secondary oscillations to operate a simulation unit which simulates at least representationally in certain areas the different vehicles being investigated, wherein the simulation unit is elastically mounted with respect to a floor on which the simulation unit is positioned;

wherein the act of using the secondary oscillations to operate the simulation unit comprises the acts of:

(d) extracting from the primary oscillations vibrations which are perceivable through the human body and converting said vibrations into vibration oscillations;

(e) inducing the vibration oscillations at at least one location of the simulation unit, from which said induced vibration oscillations are transmitted into at least one of a seat and steering wheel, wherein an oscillation exciter used to induce the vibration oscillations in the seat oscillates freely with respect to the simulation unit;

(f) selectively changing specific frequencies of the vibration oscillations; and repeating acts (a)–(f) for different vehicles to simulate the impressions of the different vehicles.

28. A travel simulator for simulating impressions subjectively perceivable by occupants in different types of vehicles, the device comprising:

oscillation exciters which output secondary oscillations in a simulating unit, the secondary oscillations simulating operation of the different types of vehicles and being acquired from primary oscillations produced when the different types of vehicles are actually being operated;

a body of the simulating unit elastically secured with respect to a base on which the body is positioned;

wherein the oscillation exciters comprise:

a first oscillation exciter which induces mechanical vibration oscillations perceivable through the human body in a seat, said first oscillation exciter being arranged in a freely oscillating fashion with respect to a seat and fixedly with respect to the body, wherein the first oscillation exciter is secured at most elastically with respect to a base on which the body of the simulating unit is positioned;

a second oscillation exciter which induces mechanical vibration oscillations perceivable through the human body in a steering wheel of the simulating unit, the second oscillation exciter being arranged in a region of a steering system of the simulating unit;

wherein at least one of the seat and the steering wheel are able to be excited so as to undergo vibration oscillations which are perceivable through the human body with the oscillation exciters; and wherein secondary oscillations are output in the simulating unit based on primary oscillations from the different types of vehicles.

* * * * *